United States Patent [19]

Yokoyama et al.

[11] Patent Number: 5,174,332

[45] Date of Patent: Dec. 29, 1992

[54] CONSTANT FLOW VALVE

[75] Inventors: Ikuo Yokoyama; Katsuhiro Onishi, both of Nobeoka, Japan

[73] Assignee: Asahi Yukizai Kogyo Co., Ltd., Miyazaki, Japan

[21] Appl. No.: 689,905

[22] PCT Filed: Sep. 28, 1990

[86] PCT No.: PCT/JP90/01259

§ 371 Date: May 30, 1991

§ 102(e) Date: May 30, 1991

[87] PCT Pub. No.: WO91/05194

PCT Pub. Date: Apr. 18, 1991

[30] Foreign Application Priority Data

Sep. 30, 1989 [JP] Japan .................................. 1-253762

[51] Int. Cl.⁵ ............................................. G05D 7/01
[52] U.S. Cl. .................................... 137/517; 137/529; 137/614.18; 137/614.19
[58] Field of Search .................... 137/517, 529, 614.18, 137/614.19

[56] References Cited

U.S. PATENT DOCUMENTS

| | | | |
|---|---|---|---|
| 2,929,402 | 3/1960 | Streeter | 137/517 |
| 2,956,583 | 10/1960 | Streeter | 137/517 |
| 3,106,226 | 10/1963 | Machen | 137/517 X |
| 4,257,452 | 3/1981 | Hill | 137/517 X |
| 4,383,550 | 5/1983 | Sotokazu | 137/517 |

FOREIGN PATENT DOCUMENTS

| | | |
|---|---|---|
| 57-90470 | 6/1982 | Japan . |
| 58-35056 | 3/1983 | Japan . |
| 62-96173 | 6/1987 | Japan . |

*Primary Examiner*—Alan Cohan
*Attorney, Agent, or Firm*—Burns, Doane, Swecker & Mathis

[57] ABSTRACT

A constant flow valve comprises a valve body (5) having an inlet passage (2), an outlet passage (3), and a hollow chamber (4) disposed between the passages and inclined with respect to the inlet passage at a certain angle; an opening (7) for connecting the outlet passage with the hollow chamber, an inner circumferential face of the opening being tapered from an upstream side toward a downstream side; a lid body (17) fitted to the valve body; a spindle (9) supported by the lid body and movable back and forth along the axis of the opening; a cylinder (10) integrally arranged at a lower end of the spindle; a valve shaft (12) freely arranged inside the cylinder and positioned substantially on the axis of the opening; a valve plug (13) fitted to a front end of the valve shaft to create an orifice between itself and the opening; and springs (14, 15) disposed inside the cylinder to force the valve plug away from the opening. The cylinder (10) is movable back and forth inside the hollow chamber (4), and a lower end face thereof may come into contact with a valve seat portion (6) of the opening (7). The springs (14, 15) have different spring constants and expand or contract in response to changes in a fluid pressure. The springs are arranged such that their expanding or contracting actions actually start at different timings.

5 Claims, 4 Drawing Sheets

CONSTANT FLOW VALVE

TECHNICAL FIELD

The present invention relates to a constant flow valve able to supply a constant flow rate of a fluid.

BACKGROUND ART

This applicant previously invented a constant flow valve serving as an automatic regulating valve intended to supplement a constant flow rate control which provided functions of controlling a constant flow rate and optionally setting a controlled flow rate, and further, acted as a stop valve which opened and closed, and applied for a Utility Model Right for the valve. This application was published as Japanese Unexamined Utility Model Publication No. 62-96173, under the title of "Constant Flow Valve".

The "Constant Flow Valve" disclosed in the above Japanese Unexamined Utility Model Publication No. 62-96173 comprises a stop-valve-type body having an opening tapered from a downstream side toward an upstream side thereof. The opening and a valve plug fitted to a lower end of a piston valve form an orifice, and a pressure differential created between a point in front of and a point behind the orifice is introduced through a pressure introducing port provided inside the piston valve, and through a pressure introducing port provided in a spring seat, into primary and secondary pressure chambers defined by a piston in a cylinder, thereby amplifying the pressure difference and operating the piston valve in response to the pressure differential to thus maintain a constant flow rate. The cylinder is movable back and forth along an axis of the opening so that an initial operation position of the valve plug with respect to the opening is changeable to enable an optional setting of the controlled flow rate. A lower end face of the cylinder has a sealing portion, which is pressed against a valve seat to completely stop a fluid flow. In this way, unlike conventional valves, this constant flow valve simultaneously has three functions of "controlling a constant flow rate", "optionally setting a controlled flow rate", and "serving as a stop valve". Inside the cylinder, where a fluid usually stagnates, the piston valve can freely slide to cause the fluid to leak from the primary pressure chamber to the secondary pressure chamber, and then to an outlet passage, to thereby prevent an occurrence of "dead water". As a result, this valve has a vital utility in the chemical industry and semiconductor manufacturing field.

Nevertheless, because this type of valve leaks a fluid from the primary pressure chamber to the secondary pressure chamber, and then to the outlet passage, it has the following two drawbacks, (1) part of the controlled flow leaks to the outlet passage, and thus there is little control of a very small flow rate and there is a limit on the range of the controlled flow rates, the range of this and other known valves is generally 4:1 to 8:1 at present, and (2) if a line involves a lot of dust, sliding parts of the piston are abraded by the dust, due to the leak of a fluid from a first pressure chamber to a second chamber, and thus malfunctions often occur.

DISCLOSURE OF THE INVENTION

In view of the above circumstances, an object of the invention is to provide a constant flow valve having a simple and compact structure which maintains the three functions of "controlling a constant flow rate", "optionally setting a controlled flow rate", and "serving as a stop valve"; has a greatly extended range of controlled flow rates, and will not malfunction due to the presence of foreign matter such as dust.

To achieve this object, the present invention provides a constant flow valve comprising a stop-valve-type valve body (hereinafter referred to as the valve body) having inlet and outlet passages which follow a curve of an inside partition wall, and a hollow chamber disposed between the inlet and outlet passages and axially inclined with respect to an axis of the inlet passage, at a certain angle; an opening arranged inside the valve body to connect the outlet passage with the hollow chamber, having an inner circumferential face tapered from an upstream side toward a downstream side thereof; a lid body fitted to the valve body; a spindle supported by the lid body, having an axis which is substantially the same as an axis of the opening, and being movable back and forth along that axis; a cylinder integrally arranged at a lower end of the spindle and movable back and forth inside the hollow chamber, and having a lower end face which comes into contact with a valve seat portion of the opening; a valve shaft freely arranged inside the cylinder substantially along the axis of the opening; a valve plug fitted to a front end of the valve shaft so that an orifice is formed between the plug and the opening; and first and second springs, disposed inside the cylinder, having different spring constants for forcing the valve plug away from the opening, the actual expanding and contracting actions of the springs reacting differently in response to fluctuations in the fluid pressure.

The material of the constant flow valve of the invention may be a plastic or metal, and is not particularly limited.

According to a preferred embodiment of the invention, the opening is formed from a tapered pipe having an opening with a curved face which is tapered from an upstream side toward a downstream side thereof, and by screwing the tapered pipe, through a sealing valve seat portion, to the partition wall and to an inner wall of the valve body at the bottom of the hollow chamber.

The valve plug has a truncated cone shape.

The first and second springs are arranged in parallel with each other. A spring constant of the first spring is smaller than that of the second spring, and a free length of the first spring is greater than that of the second spring.

According to another preferred embodiment, the first and second springs are arranged in series, and the spring constant of the first spring is smaller than that of the second spring.

BEST MODE OF CARRYING OUT THE INVENTION

Figure 1:
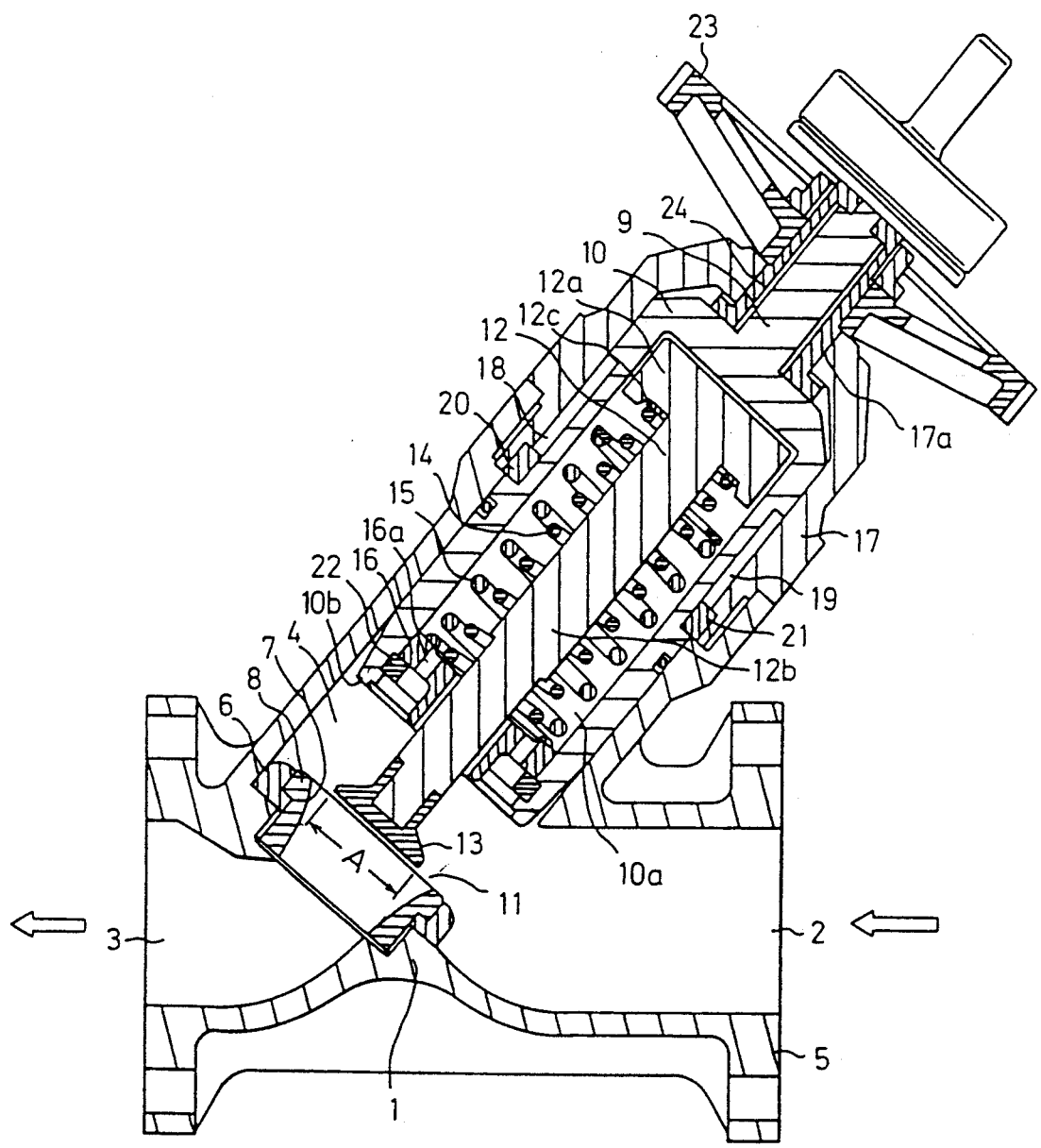
FIG. 1 is a longitudinal section showing a constant flow valve according to an embodiment of the invention.

Embodiments of the invention will be explained with reference to FIGS. 1 and 3. FIG. 1 shows a first embodiment of the invention. The first embodiment relates to a Y-type constant flow valve in which an axis of a hollow chamber 4 is inclined toward an upstream side relative to an axis of an inlet passage 2.

The axis of the hollow chamber 4 may be vertical to the axis of the inlet passage 2.

In FIG. 1, numeral 5 is a valve body having a partition wall 1 disposed inside the valve body, an inlet passage 2 and an outlet passage 3 which follow the curve of the partition wall 1, and a hollow chamber 4 located between the inlet passage 2 and the outlet passage 3.

Numeral 8 is a tapered flow pipe, and a sealing valve seat portion 6 is fitted and attached to an upper peripheral face of the tapered flow pipe. The inside of the tapered flow pipe 8 forms an opening 7 having a curved face which is tapered from an upstream side toward a downstream side. The tapered flow pipe 8 is screwingly attached to the partition wall 1 and to an inner wall of the valve body at the bottom of the hollow chamber 4, such that the valve seat portion 6 is held there and an axis of the opening 7 substantially agrees with an axis of the hollow chamber 4, whereby the hollow chamber 4 communicates with the outlet passage 3. In this embodiment, the opening 7 is formed in the tapered flow pipe 8, which is screwed to the valve body 5. The opening may be formed directly on the inner wall of the valve body 5 at the bottom of the hollow chamber 4 and on the partition wall 1.

Numeral 17 is a lid body with a cylindrical shape having an opening 17a at an upper central part thereof and a threaded portion on a lower peripheral face thereof. The threaded portion is screw-fastened to an inner threaded portion of the valve body 5 formed at an upper part of the hollow chamber 4. The opening 17a of the lid body 17 holds a spindle 9 having an axis substantially matching the axis of the opening 7, and a sleeve 24 is screwed to the spindle 9. Numeral 10 denotes a cylinder which is integrally formed at a lower end of the spindle 9 and has an inside hollow chamber 10a. An axis of the cylinder 10 substantially matches the axis of the opening 7. A lower part and a sealing lower end face 10b of the cylinder are movable back and forth inside the hollow chamber 4 of the valve body 5, and an upper part of the cylinder is movable inside the lid body 17. A pair of guide grooves 18 and 19 are arranged on the periphery of the cylinder 10 and diametrically face each other to engage with projections 20 and 21 fixed to a lower internal end face of the lid body 17, so that the cylinder 10 is movable only up and down and cannot rotate. Numeral 12 is a valve shaft having a piston-like collar 12a at its upper end, and a truncated conical shape valve plug 13 attached and fixed at the lower end thereof. The valve shaft is movable back and forth inside the hollow chamber 10a of the cylinder 10. The valve plug 13 is positioned substantially on the axis of the opening 7. An orifice 11 is created as required between the valve plug and the opening 7. The shape of the valve plug 13 is not limited to the truncated cone but may be a disk-like shape or an inverted truncated conical shape. This embodiment shows an example of preferred shapes of the valve plug. Numerals 14 and 15 denote first and second springs, respectively. A spring constant of the first spring is smaller than that of the second spring, and a free length of the first spring is greater than that of the second spring. A shaft portion 12b of the valve shaft 12 is inserted in the first spring 14, an upper end of the first spring is placed in a spring seating groove 12c formed on a lower face of the piston-like collar 12a, and a lower end face of the first spring is in contact with a spring seat 16 explained later. The first spring 14 is inserted into the second spring. The second spring is in a free state inside the cylinder hollow chamber 10a such that an upper end face thereof comes into contact with the lower end face of the collar 12a of the valve shaft 12, or a lower end face thereof comes into contact with the spring seat 16, depending on a fitting angle of the constant flow valve. The shaft portion 12b of the valve shaft 12, first spring 14, second spring 15, and the inner face of the cylinder 10 are arranged so that they do not touch one another, as much as possible.

The springs are usually made of metal. If corrosion resistance is required, the springs may be completely coated with a plastic such as fluororesin.

Numeral 16 is an annular spring seat having an internal circular opening through which the valve shaft 12 freely slides. To allow a fluid to flow in and out of the hollow chamber 10a of the cylinder 10, the spring seat has a plurality of pressure introducing ports 16a. The spring seat is fitted to the cylinder 10 with a stop ring 22. Numeral 23 is a handle fixed to the sleeve 24 engaging with the spindle 9. In FIG. 1, the handle 23 may be turned to move the spindle 9 and cylinder 10 up and down.

Figure 2:
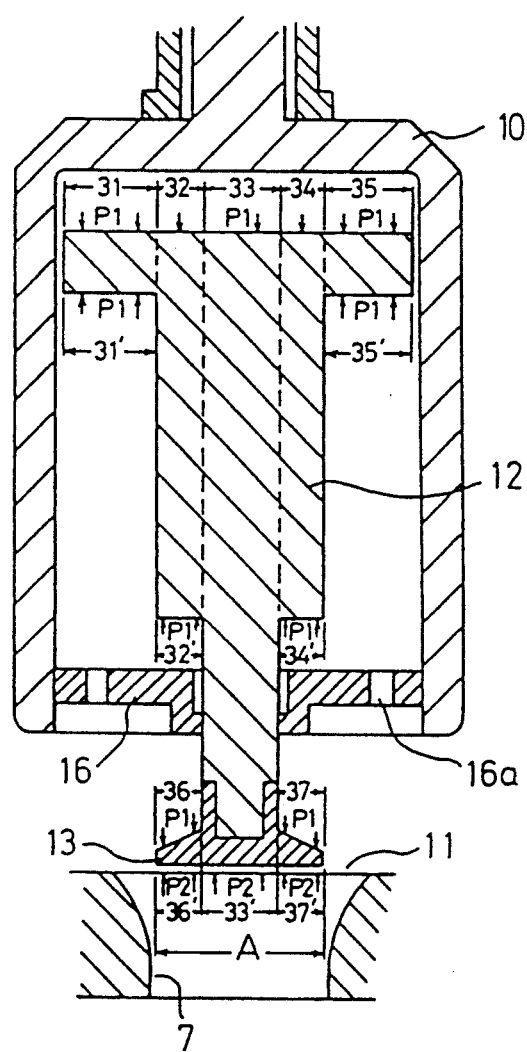
FIG. 2 is a longitudinal section showing essential parts of the valve and explaining a pressure balance of a fluid.

An operation of the embodiment with the above arrangement will be explained with reference to FIGS. 1 and 2. In FIG. 1, a fluid passes through the inlet passage 2, reaches the hollow chamber 4, passes through the orifice 11 created between the opening 7 and valve plug 13, and flows to the outlet passage 3. When the fluid passes through the orifice 11, it causes a pressure differential $\Delta P$ between pressures at an upstream side and downstream side of the orifice. In FIG. 2, P1 denotes the pressure on the upstream side of the orifice 11, and P2 denotes the pressure on the downstream side of the orifice 11. In the figure, numerals 31 to 37 and 31' to 37' denote pressure receiving sections of the valve shaft 12 and valve plug 13. The pressure P1 is introduced through the pressure introducing ports 16a into the cylinder 10 and acts on the whole surface of the valve shaft 12, in which the sections 31 and 31', 32 and 32', 34 and 34', and 35 and 35' receive the pressure P1 on both their top and bottom faces, to cancel the pressure. On the other hand, the sections 36 and 36', 33 and 33', and 37 and 37' receive the pressure P1 on their top faces and the pressure P2 on their bottom faces. Assuming a sum of projected areas of the sections 36, 33, and 37 is A, it is apparent that $A = 36' + 33' + 37'$, and as a result, the pressure differential $\Delta P$ ($= P1 - P2$) acts only on the area A on the surfaces of the valve shaft 12 and valve plug 13. Accordingly, in FIG. 1, the valve shaft 12 and valve plug 13 receive a load of $A \times \Delta P$ (Kgf) and move along the axis of the opening 7. If the pressure differential $\Delta P$ and its fluctuation are relatively small, the valve shaft 12 compresses only the first spring 14 while moving toward the opening 7, or conversely, is pushed by a repulsive resilient force of the first spring 14 away from the opening 7. When the pressure differential $\Delta P$ and its fluctuation are relatively large, the valve shaft 12 compresses the first spring 14 to a certain extent and then receives a strong repulsive resilient force of the second spring 15 while moving toward the opening 7, or receives opposite reactions to move away from the opening 7. According to the operation of the valve shaft 12 and the interlocking operation of the valve plug 13 in response to changes in the pressure differential $\Delta P$, the orifice 11 created between the opening 7 and the valve plug 13 is expanded or narrowed. If, for some reason, the upstream pressure of the fluid flowing through the valve body 5 increases, or if the downstream pressure is reduced to thus increase a flow rate of the fluid, the pressure differential $\Delta P$ becomes larger. Then, the valve plug 13 automatically reduces the orifice 11 accordingly, as mentioned above, to instantaneously lower the flow rate and control it to a preset flow rate value. On the other hand, if for some reason, the upstream pressure drops or the downstream pressure rises, to reduce the flow rate of the fluid flowing through the valve, the pressure differential $\Delta P$ becomes smaller. The valve plug 13 then automatically expands the orifice 11 accordingly, as mentioned above, to instantaneously increase the flow rate and control it to the preset flow rate value. With these actions of the respective parts, the flow rate is kept constant even if the pressure differential upstream and downstream of the valve body 5 fluctuates. To effectively achieve these actions, a spring constant of the first spring 14 must be smaller than that of the second spring 15. The opening 7 is smoothly curved so that a flow rate can be set in a wide range and a constant flow rate be optionally controlled irrespective of an operation starting position of the valve plug 13. When the handle 23 is turned in a closing direction, to move the spindle 9 and cylinder 10 toward the opening 7, the valve plug 13 moves accordingly, and since the opening 7 is tapered toward the downstream side, the orifice 11 narrows accordingly. When the valve plug 13 is operated at this position, the orifice 11 changes in a relatively narrow range to control the fluid. Namely, the initial operation position of the valve plug is changed to control the fluid in a relatively small flow rate range. On the other hand, when the handle 23 is turned in an opening direction to move the spindle 9 and cylinder 10 away from the opening 7, the orifice 11 widens in the opposite action, and when the valve plug 13 is operated at this position, the orifice 11 changes in a relatively widened range to control the fluid. Namely, the initial operation position of the valve plug is changed to control the fluid in a relatively large flow rate range. In this way, the movements of the spindle 9 and cylinder 10 control the flow rate optionally in the large and small flow rate ranges.

When the spindle 9 and cylinder 10 are moved toward the opening 7 to press the sealing lower end face 10b of the cylinder 10 against the valve seat portion 6 of the opening 7, the hollow chamber 4 is completely closed against the outlet passage 3, thereby stopping the fluid flow and putting the valve in a completely closed state.

Figure 3:
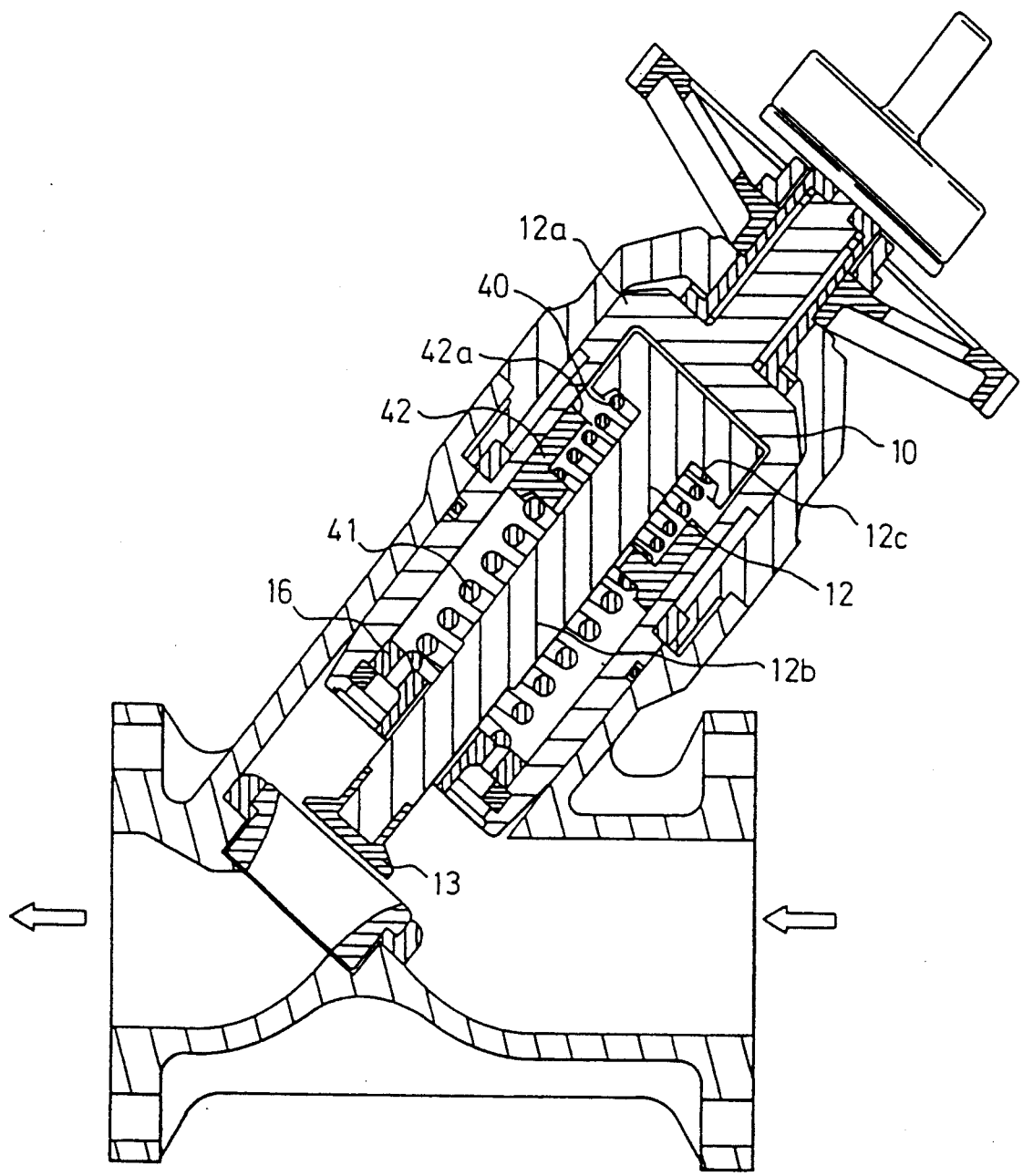
FIG. 3 is a longitudinal section showing another embodiment.

FIG. 3 shows a second embodiment of the invention. First and second springs 40 and 41 are arranged in series through a movable spring seat 42. The other arrangements are the same as those of the first embodiment, and therefore, an explanation thereof is omitted.

The first spring 40 has an upper end portion in a spring seating groove 12c of a valve shaft 12, and a lower end portion in contact with an upper face of the movable spring seat 42. The second spring 41 has an upper end portion in contact with a lower face of the movable spring seat 42, and a lower end portion in contact with a spring seat 16. The movable spring seat 42 has a central opening through which a shaft portion 12b of the valve shaft 12 extends without touching the opening. The movable spring seat can slide freely on an inner circumferential face of a cylinder 10.

An operation of the embodiment with the above arrangement will be explained only for the valve shaft 12, valve plug 13, first spring 40, second spring 41, and movable spring seat 42. The operations of the other parts are the same as those of the first embodiment, and therefore, an explanation thereof is omitted.

In FIG. 3, when the valve shaft 12 and valve plug 13 receive a load of $A \times \Delta P$ (Kgf) due to a pressure differential $\Delta P$, and when the $\Delta P$ and its fluctuation are relatively small, the valve shaft and valve plug move toward an opening 7 to a certain extent while compressing mainly the first spring, or conversely, are pushed mainly by the first spring 40. When the $\Delta P$ and its fluctuation are large, a collar 12a of the valve shaft comes into contact with a cylindrical projection 42a of the movable spring seat 42 to compress mainly the second spring 41, or conversely, are pushed mainly by the second spring 41. In this way, the valve plug 13 operates in response to the magnitude of fluctuation of the pressure differential $\Delta P$ to expand or reduce an orifice 11 created between the valve plug 13 and the opening 7, thereby automatically and instantaneously controlling an increase or a decrease in a flow rate caused by the fluctuation, and restoring a set value. To effectively attain such effects, a spring constant of the first spring 40 must be smaller than that of the second spring 41.

Figure 4:
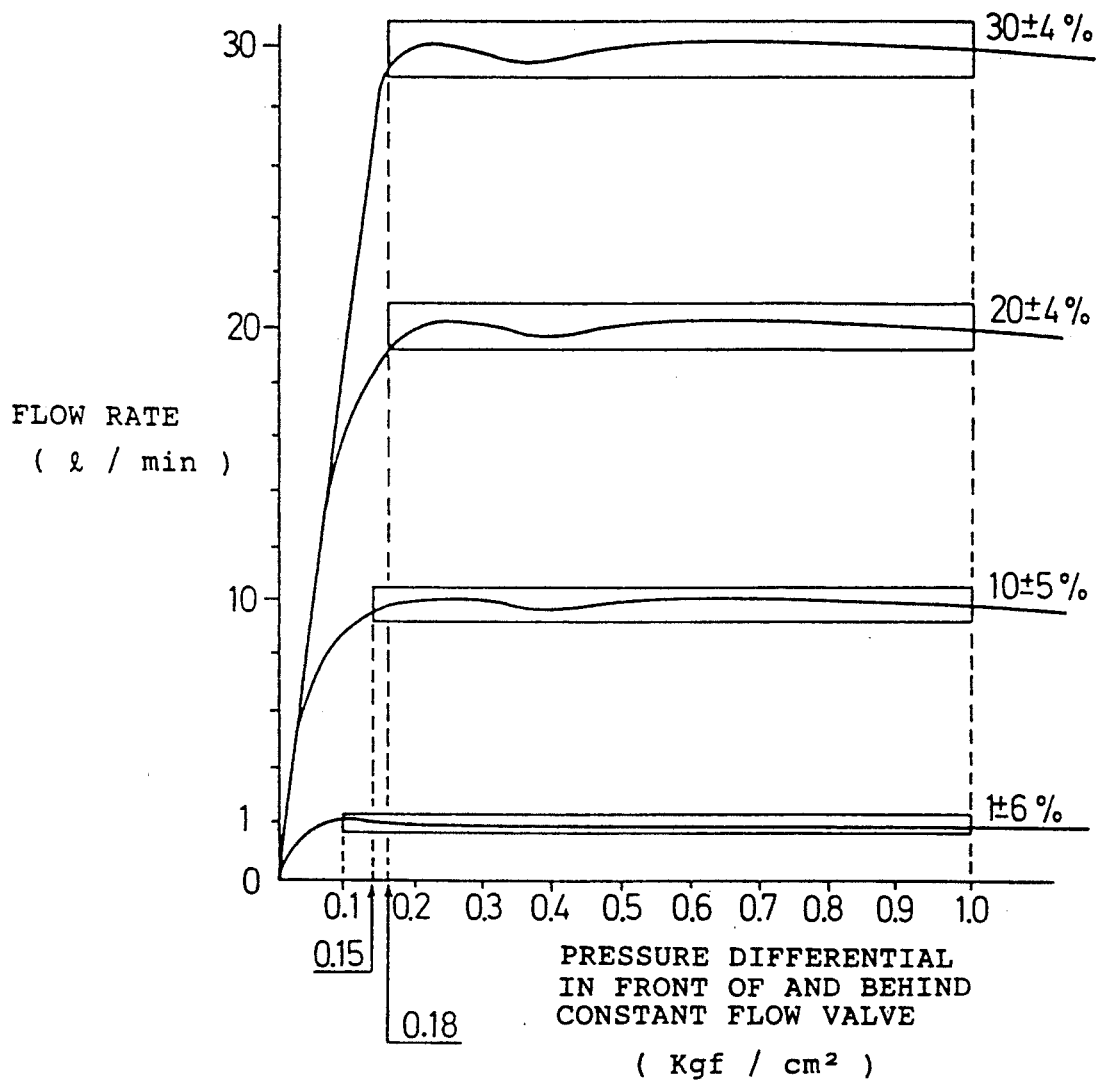
FIG. 4 shows flow rate characteristics according to results of actual flow tests.

On a constant flow valve with the arrangement of FIG. 1 having a diameter of $25^{\Delta}$, actual flow tests were made under the conditions mentioned below. FIG. 4 shows the flow rate characteristics of the results of the tests.

Conditions

Fluid:water
Temperature:25° C.
Range of set flow rates of the valve: 1 to 30 l/min.
Pressure differential in front of and behind the valve: 0 to 1.0 kgf/cm$^2$
Spring constants
  First spring:0.35 kgf/mm
  Second spring:0.91 kgf/mm
The results of the tests with the above conditions were as follows:
Accuracy: within $\pm 4$ to $\pm 6\%$ of respective set values
Range of controlled pressure difference: (0.1 to 0.18) to 1.0 kgf/cm$^2$
Pressure loss: 0.1 to 0.18 kgf/cm$^2$
Range ability: 30:1 (4:1 to 8:1 for conventional valves)

As apparent from FIG. 4, the constant flow valve of the invention is able to control a wide range of flow rates, from a large flow rate to a small flow rate (range ability of 30:1), and showed a good control accuracy of $\pm 4$ to $\pm 6\%$ for the respective set values.

The present invention provides the following effects:

(1) A control of a very wide range of flow rates, from a small flow rate to a large flow rate. Unlike conventional valves which achieve a range ability of 4:1 to 8:1, the constant flow valve of the invention achieves a greatly expanded range ability of 30:1.

(2) The valve of the invention controls a fluid only by the expanding and narrowing of the orifice created between the valve plug and the opening, so that, unlike the conventional valves, malfunctions due to dust and foreign matter in piping do not occur, thereby realizing a stable flow rate control for a long period.

(3) In addition to the novel advantages of the above (1) and (2), the valve of the invention provides the conventional three functions of "controlling a constant flow rate", "optionally setting a controlled flow rate", and "serving as a stop valve".

EXPLOITATION IN INDUSTRY

The present invention is preferably applicable for piping for transporting fluids such as tap water, industrial water, agricultural water, petroleum, liquid chemicals, etc.

We claim:

1. A constant flow valve comprising a stop-valve-type valve body having inlet and outlet passages which follow a curve of an inside partition wall, and a hollow chamber disposed between the inlet and outlet passages to communicate with the inlet passage, an axis of the hollow chamber being inclined at a certain angle with respect to an axis of the inlet passage; and opening arranged inside the valve body to connect the outlet passage with the hollow chamber, having an inner circumferential face tapered inwardly from an upstream side toward a downstream side; a lid body fitted to the valve body; a spindle supported by the lid body and movable back and forth along an axis thereof which substantially matches the axis of the opening; a cylinder integrally arranged at a lower end of the spindle on the upstream side to be movable back and forth inside the hollow chamber, a lower end face of the cylinder being capable of coming into contact with a valve seat portion of the opening; a valve shaft freely arranged inside the cylinder substantially on the axis of the opening; a valve plug on the upstream side fitted to a front end of the valve shaft to form an orifice between the valve plug and the opening; at least one of the valve shaft and the valve plug being formed as a solid article; and a plurality of springs having different spring constants and being disposed inside the cylinder to force the valve plug away from the opening in such a manner that the expanding or contracting actions of the springs start at different timings in response to changes in a fluid pressure.

2. A constant flow valve as set forth in claim 1, wherein the opening is made from a tapered pipe having an opening with a curved face which is tapered from an upstream side toward a downstream side, the tapered pipe being screw-attached, through the sealing valve seat portion, to the partition wall and to an inner wall of the valve body at the bottom of the hollow chamber.

3. A constant flow valve as set forth in claim 1, wherein the valve plug has a truncated cone shape.

4. A constant flow valve as set forth in claim 1, wherein the first and second springs are arranged in parallel with each other, a spring constant of the first spring being smaller than that of the second spring, and a free length of the first spring being greater than that of the second spring.

5. A constant flow valve as set forth in claim 1, wherein the first and second spring are connected in series, a spring constant of the first spring being smaller than that of the second spring.

* * * * *

REEXAMINATION CERTIFICATE (2238th)
United States Patent [19]
Yokoyama et al.

[11] B1 5,174,332
[45] Certificate Issued    Mar. 1, 1994

[54] CONSTANT FLOW VALVE

[75] Inventors: Ikuo Yokoyama; Katsuhiro Onishi, both of Nobeoka, Japan

[73] Assignee: Asahi Yukizai Kogyo Co., Ltd., Miyazaki, Japan

Reexamination Request:
No. 90/003,120, Jul. 8, 1993

Reexamination Certificate for:
Patent No.: 5,174,332
Issued: Dec. 29, 1992
Appl. No.: 689,905
Filed: May 30, 1991

[22] PCT Filed: Sep. 28, 1990
[86] PCT No.: PCT/JP90/01259
§ 371 Date: May 30, 1991
§ 102(e) Date: May 30, 1991
[87] PCT Pub. No.: WO91/05194
PCT Pub. Date: Apr. 18, 1991

[30] Foreign Application Priority Data
Sep. 30, 1989 [JP] Japan ........................... 1253762

[51] Int. Cl.$^5$ ................................. G05D 7/01
[52] U.S. Cl. ................................. 137/517; 137/529; 137/614.18; 137/614.19
[58] Field of Search ............... 137/517, 529, 614.18, 137/614.19

[56] References Cited
U.S. PATENT DOCUMENTS

| | | | |
|---|---|---|---|
| 2,929,402 | 3/1960 | Streeter | 137/517 |
| 2,956,583 | 10/1960 | Streeter | 137/517 |
| 3,106,226 | 10/1963 | Machen | 137/517 X |
| 4,257,452 | 3/1981 | Hill | 137/517 X |
| 4,383,550 | 5/1983 | Sotokazu | 137/517 |
| 4,592,383 | 6/1986 | Rikuta | 137/454.6 |
| 4,791,956 | 12/1988 | Kominami et al. | 137/614.18 X |

FOREIGN PATENT DOCUMENTS
57-90470  6/1982  Japan.
58-35056  3/1983  Japan.
62-96173  6/1987  Japan.

*Primary Examiner*—John Rivell

[57] ABSTRACT

A constant flow valve comprises a valve body (5) having an inlet passage (2), an outlet passage (3), and a hollow chamber (4) disposed between the passages and inclined with respect to the inlet passage at a certain angle; an opening (7) for connecting the outlet passage with the hollow chamber, an inner circumferential face of the opening being tapered from an upstream side toward a downstream side; a lid body (17) fitted to the valve body; a spindle (9) supported by the lid body and movable back and forth along the axis of the opening; a cylinder (10) integrally arranged at a lower end of the spindle; a valve shaft (12) freely arranged inside the cylinder and positioned substantially on the axis of the opening; a valve plug (13) fitted to the front end of the valve shaft to create an orifice between itself and the opening; and springs (14, 15) disposed inside the cylinder to force the valve plug away from the opening. The cylinder (10) is movable back and forth inside the hollow chamber (4), and a lower end face thereof may come into contact with a valve seat portion (6) of the opening (7). The springs (14, 15) have different spring constants and expand or contract in response to changes in a fluid pressure. The springs are arranged such that their expanding or contracting actions actually start at different timings.

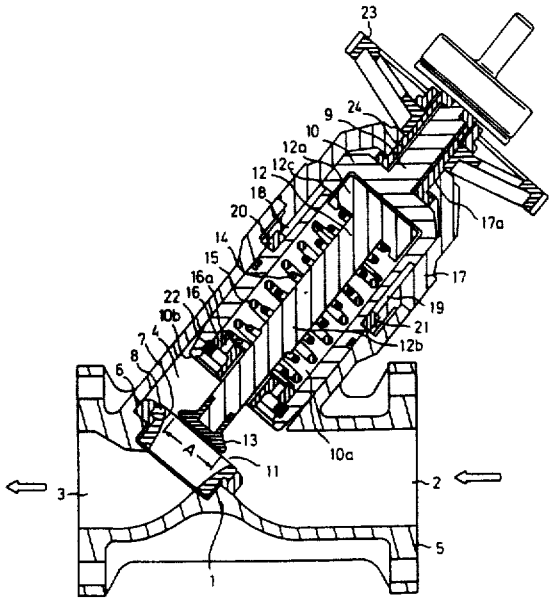

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-5, dependent on an amended claim, are determined to be patentable.

1. A constant flow valve comprising a stop-valve-type valve body having inlet and oulet passages which follow a curve of an inside partition wall, and a hollow chamber disposed between the inlet and oulet passages to communicate with the inlet passage, an axis of the hollow chamber being inclined at a certain angle with respect to an axis of the inlet passage; [and] *an* opening arranged inside the valve body to connect the outlet passage with the hollow chamber, having an inner circumferential face tapered inwardly from an upstream side toward a downstream side; *a lid body fitted to the valve body; a spindle supported by the lid body and movable back and forth along an axis thereof which substantially matches the axis of the opening; a cylinder integrally arranged at a lower end of the spindle on the upstream side to be movable back and forth inside the hollow chamber, a lower end face of the cylinder being capable of coming into contact with a valve seat portion of the opening; a valve shaft freely arranged inside the cylinder substantially on the axis of the opening; a valve plug on the upstream side fitted to a front end of the valve shaft to form an orifice between the valve plug and the opening; at least one of the valve shaft and the valve plug being formed as a solid article; and a plurality of springs having different spring constants and being disposed inside the cylinder to force the valve plug away from the opening in such a manner that the expanding or contracting actions of the springs start at different timings in response to changes in a fluid pressure.*

* * * * *